US007680031B1

(12) United States Patent  
Luft et al.

(10) Patent No.: US 7,680,031 B1  
(45) Date of Patent: Mar. 16, 2010

(54) METHOD AND APPARATUS FOR LOAD BALANCING AND PROTECTING DATA TRAFFIC IN AN OPTICAL RING

(75) Inventors: Siegfried Luft, Vancouver (CA); Thomas J. Meehan, New York, NY (US); Peter J. Owens, Port Moody (CA); Christopher R. Stein, Langley (CA)

(73) Assignee: Redback Networks Inc., San Jose, CA (US)

( * ) Notice: Subject to any disclaimer, the term of this patent is extended or adjusted under 35 U.S.C. 154(b) by 1242 days.

(21) Appl. No.: 10/159,625

(22) Filed: May 31, 2002

Related U.S. Application Data

(60) Provisional application No. 60/376,039, filed on Apr. 26, 2002.

(51) Int. Cl.  
*G01R 31/08* (2006.01)

(52) U.S. Cl. .................................. 370/222; 370/256

(58) Field of Classification Search .................. 370/216, 370/217, 218, 221, 222, 225, 256, 227, 228, 370/389, 392, 401  
See application file for complete search history.

(56) References Cited

U.S. PATENT DOCUMENTS 5,159,595 A    10/1992  Flanagan et al.
5,959,989 A *  9/1999  Gleeson et al. ............. 370/390
6,032,194 A *  2/2000  Gai et al. .................... 709/239
6,160,648 A * 12/2000  Oberg et al. .................. 398/4
6,188,694 B1 * 2/2001  Fine et al. ................... 370/402
6,515,969 B1 * 2/2003  Smith ......................... 370/256
6,628,661 B1 * 9/2003  Goldman et al. ............ 370/408
6,678,241 B1 * 1/2004  Gai et al. .................... 370/216
6,717,922 B2 * 4/2004  Hsu et al. .................... 370/258
6,766,482 B1 * 7/2004  Yip et al. ..................... 714/717
6,917,986 B2 * 7/2005  Mor et al. ................... 709/238
7,054,277 B1 * 5/2006  Lau et al. .................... 370/256
2002/0023170 A1 * 2/2002 Seaman et al. .............. 709/235

OTHER PUBLICATIONS

Aybay, G., et al., Resilient Packet Ring Alliance, "An Introduction to Resilient Packet Ring Technology," Oct. 2001.  
Holland, G., "Carrier Class Networking: The High Availability Features of Riverstone's RS Metro Routers," Riverstone Networks # 135 Technology White Paper, Apr. 2002.

(Continued)

*Primary Examiner*—Ricky Ngo  
*Assistant Examiner*—Christine Ng  
(74) *Attorney, Agent, or Firm*—Blakely, Sokoloff, Taylor & Zafman, LLP

(57) ABSTRACT

A method and apparatus for load balancing and protecting data traffic in an optical ring is described. A method comprises configuring multiple spanning trees in a set of one or more network elements of an optical ring, load balancing with the multiple spanning trees data traffic transmitted in unprotected data channels provisioned through the optical ring, and protecting the unprotected data channels with the multiple spanning trees.

10 Claims, 8 Drawing Sheets

OTHER PUBLICATIONS

Nortel Networks, "Comparing Optical Ethernet Resilient Packet Ring to Packet Over SONET," http://www.nortelnetworks.com/products/library/collateral/56029.25-12-01.pdf.

O'Connor, M., "The Ethernet Physical Layer as Used in Resilient Packet Ring Systems," 10 GEA, Version 9.0, Apr. 2002.

G. C. Shoja, and W. Taylor, "Extending the Computational Bandwidth of Engineering Workstations", Proceedings of the Seventh Annual IEEE Phoenix Conference on Computer and Communications, Mar. 16-18, 1988, pp. 357-362.

* cited by examiner

METHOD AND APPARATUS FOR LOAD BALANCING AND PROTECTING DATA TRAFFIC IN AN OPTICAL RING

CROSS-REFERENCE TO RELATED APPLICATIONS

This application claims the benefit of U.S. Provisional Patent Application No. 60/376,039, entitled "Method and Apparatus for Load Balancing and Protecting Data Traffic in an Optical Ring" filed on Apr. 26, 2002.

BACKGROUND OF THE INVENTION

1. Field of the Invention

The invention relates to the field of communication. More specifically, the invention relates to communication networks.

2. Background of the Invention

Current networks must satisfy consumer demand for more bandwidth and a convergence of voice and data traffic. The increased demand of bandwidth by consumers combines with improved high bandwidth capacity of core networks to make edge networks a bottleneck despite the capacity of optical networks.

Multiplexing is used to deliver a variety of traffic over a single high speed broadband line. An optical standard such as Synchronous Optical Network (SONET) or Synchronous Digital Hierarchy (SDH) in conjunction with a multiplexing scheme is used to deliver various rates of traffic over a single high speed optical fiber. SONET/SDH is a transmission standard for optical networks which corresponds to the physical layer of the open standards institutes (OSI) network model. One of the protection schemes for SONET/SDH involves automatic protection switching (APS) in a bi-directional line switched ring (BLSR) architecture. BLSR utilizes linear switching to implement APS.

High speed optical rings offer large amounts of bandwidth, but the protection scheme utilizes 50% of that bandwidth. This 50% of total bandwidth for a protection channel typically goes unused while there is not a failure. It is typically unused because traffic transmitted in the protection channel would be preempted by the working TDM traffic when a failure occurs.

An alternative to unprotected preemptable traffic in a protection channel is to provide a non-preemptable unprotected traffic (NUT) channel. A NUT channel allows for an implementation that runs a unidirectional path switched ring (UPSR) over a BLSR. Unfortunately, the traffic carried in a NUT channel may be dropped if a failure occurs in the BLSR. Hence, certain customers will not purchase NUT channels.

BRIEF SUMMARY OF THE INVENTION

A method and apparatus for utilization of spanning trees in an optical ring is described. According to one aspect of the invention, a method in a network element provides for configuring multiple spanning trees in a set of one or more network elements of an optical ring, load balancing with the multiple spanning trees data traffic transmitted in unprotected data channels provisioned through the optical ring, and protecting the unprotected data channels with the multiple spanning trees.

These and other aspects of the present invention will be better described with reference to the Detailed Description and the accompanying Figures.

BRIEF DESCRIPTION OF THE DRAWINGS

The invention may best be understood by referring to the following description and accompanying drawings that are used to illustrate embodiments of the invention. In the drawings.

DETAILED DESCRIPTION OF THE INVENTION

In the following description, numerous specific details are set forth to provide a thorough understanding of the invention. However, it is understood that the invention may be practiced without these specific details. In other instances, well-known circuits, structures, standards, and techniques have not been shown in detail in order not to obscure the invention.

Figure 1A:
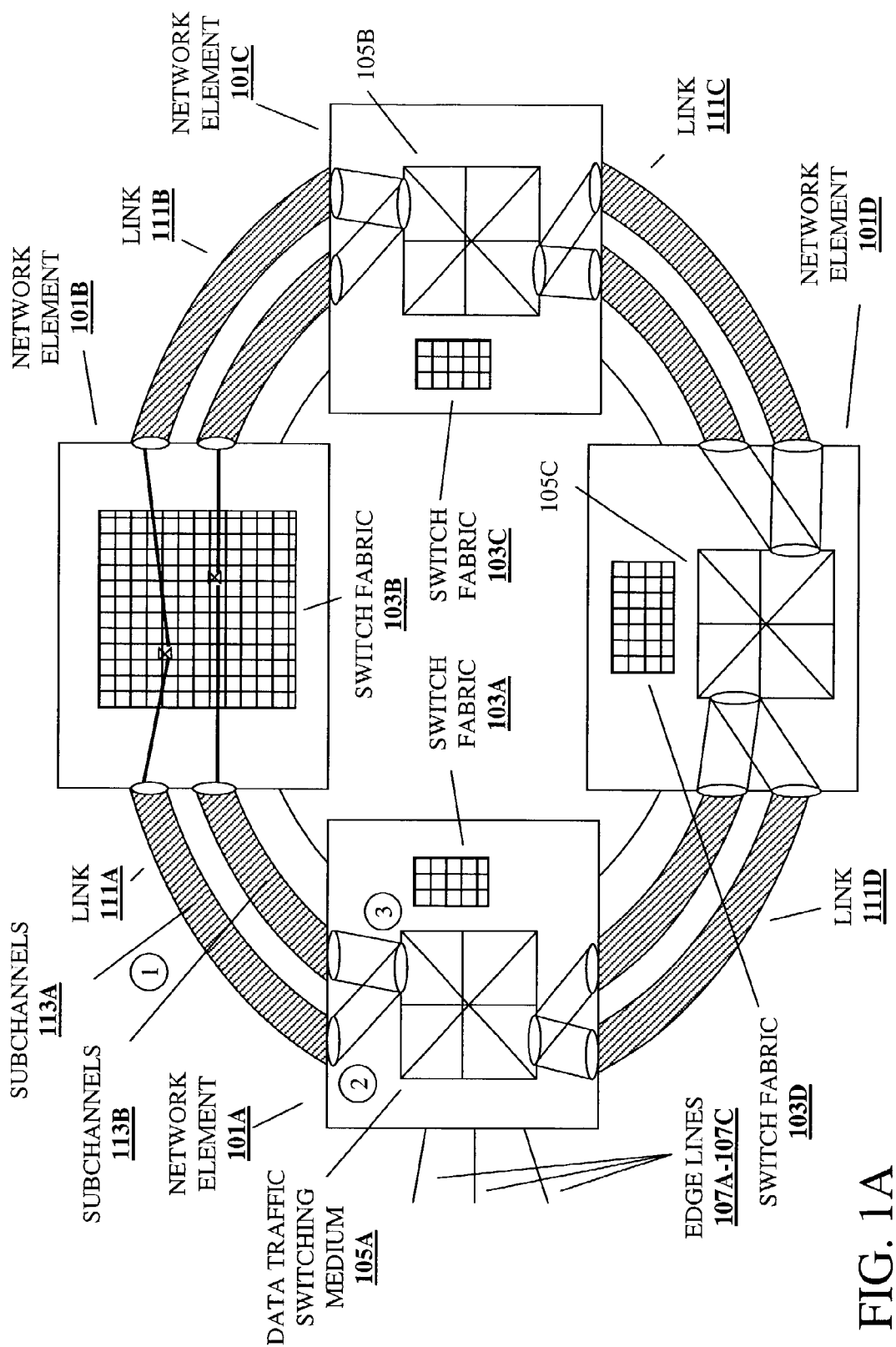
FIG. 1A is an exemplary diagram illustrating provisioning of an unprotected data channel in an optical ring according to one embodiment of the invention.
Figure 1B:
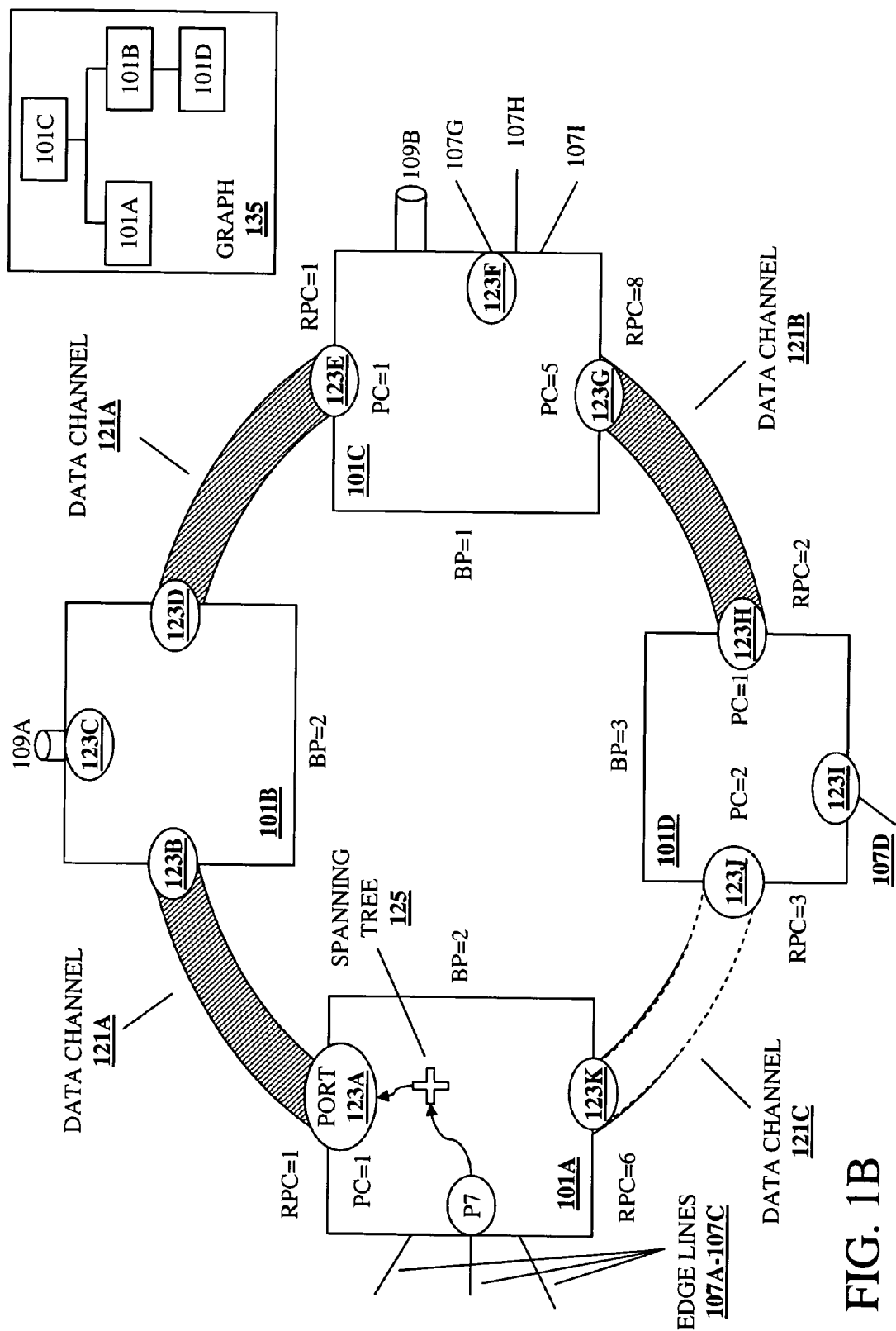
FIG. 1B is an exemplary diagram illustrating configuration of metrics and creation of spanning trees in an optical ring according to one embodiment of the invention.

FIGS. 1A-1B are exemplary diagrams illustrating creation of a spanning tree for an unprotected data channel in an optical ring according to one embodiment of the invention. FIG. 1A is an exemplary diagram illustrating provisioning of an unprotected data channel in an optical ring according to one embodiment of the invention. In FIG. 1A, network elements 101A-101D comprise an optical ring. The optical ring illustrated in FIG. 1A is connected in the following manner: the link 111A connects the network elements 101A and 101B; the link 111B connects the network elements 101B and 101C; the link 111C connects the network elements 101C and 101D; and a link 111D connects the network elements 101D and 101A. The links illustrated in FIG. 1A are bi-directional links, but the described invention can also be applied to a unidirectional ring.

The network element 101A includes a switching fabric 103A and a data traffic switching medium 105A. Edge lines 107A-107C connect the network element 101A to non-core network elements, which are not illustrated. At a time 1, the set of subchannels 113A and a set of sub-channels 113B are selected. At a time 2, the set of selected sub-channels 113A are concatenated. Likewise, the set of selected sub-channels 113B are concatenated. Although this illustration describes sets of subchannels, another example can involve a single subchannel that does not get concatenated. At a time 3, the concatenated set of selected subchannels 113A and the concatenated set of selected subchannels 113B are aggregated and terminated on the data traffic switching medium 105A.

The same set of operations are performed for each trunk port of the optical ring of the network elements 101C and 101D.

The network element 101B does not include a data traffic switching medium. Therefore, the concatenated set of selected subchannels 113A and the concatenated selected set of subchannels 113B are not terminated and aggregated in the network element 101B. In the network element 101B, the concatenated selected set of subchannels 113A are cross connected through a switch fabric 103B. Similarly, the concatenated set of selected subchannels 113B are cross connected through the switch fabric 103B.

FIG. 1B is an exemplary diagram illustrating configuration of metrics and creation of spanning trees in an optical ring according to one embodiment of the invention. In FIG. 1B, the aggregated concatenated selected set of subchannels 113A and 113B are illustrated as an unprotected data channel 121A-121C. The unprotected data channel 121A begins at the network element 101A and terminates at the network element 101C, traversing the network element 101B. The unprotected data channel 121B runs between the network elements 101C and 101D. The unprotected data channel 121C runs between the network elements 101D and 101A.

In creating a spanning tree, metrics are defined for the spanning tree. Defining metrics includes assigning bridge priorities and defining path costs. At a time 1, a bridge priority is defined for network elements 101A, 101C, and 101D. The bridge priority for the network element 101C is defined as 1. The bridge priority for the network element 101D is defined as 3. The bridge priority for the network element 101A is defined as 2. In this illustration, the lower number has a higher priority. At a time 2, the path costs are defined. The path costs are shown in Table 1 below.

TABLE 1

Path Costs

| LINK | PORT | PATH COSTS |
| --- | --- | --- |
| 101A → 101C | 123A | 1 |
| 101C → 101D | 123G | 5 |
| 101D → 101A | 123J | 2 |
| 101A → 101D | 123K | 4 |
| 101D → 101C | 123H | 1 |
| 101C → 101A | 123E | 1 |

Once the path costs are defined, the root bridge is determined. The root bridge is determined by the network elements 101A, 101C, and 101D sending out bridge protocol data units announcing themselves as the root bridge. Upon determining that a different network element has a higher priority, a network element will identify the network element with the higher priority as the root bridge. In FIG. 1B, the network element 101C has the highest priority. Therefore, the network element 101C will be the root bridge. Once the root bridge is determined and the path costs are defined, root path costs are calculated. Root path cost is the sum path cost to reach the root bridge. The root path costs are calculated as shown in Table 2.

| LINK | PORT | ROOT PATH COSTS |
| --- | --- | --- |
| 101A → 101C | 123A | 1 |
| 101A → 101B | 123K | 5 |
| 101D → 101C | 123H | 1 |
| 101D → 101B | 123J | 3 |

Table 2

Root Path Costs

The spanning tree that is created from defined metrics are presented by a graph 135. The graph 135 shows the network element 101C as root of a tree. The left branch of the tree connects the network element 101A and the right branch of the tree connects the network element 101B. Since the root path cost to network element 101A through port 123A is cheaper than the root path cost through port 123K, the spanning tree of the network element 101A blocks the port 123K (discards the link 121C and does not forward through traffic the port 123K). The spanning tree of the network element 101D selects port 123H to reach the root path bridge and blocks port 123J, which is more expensive.

Figure 2A:
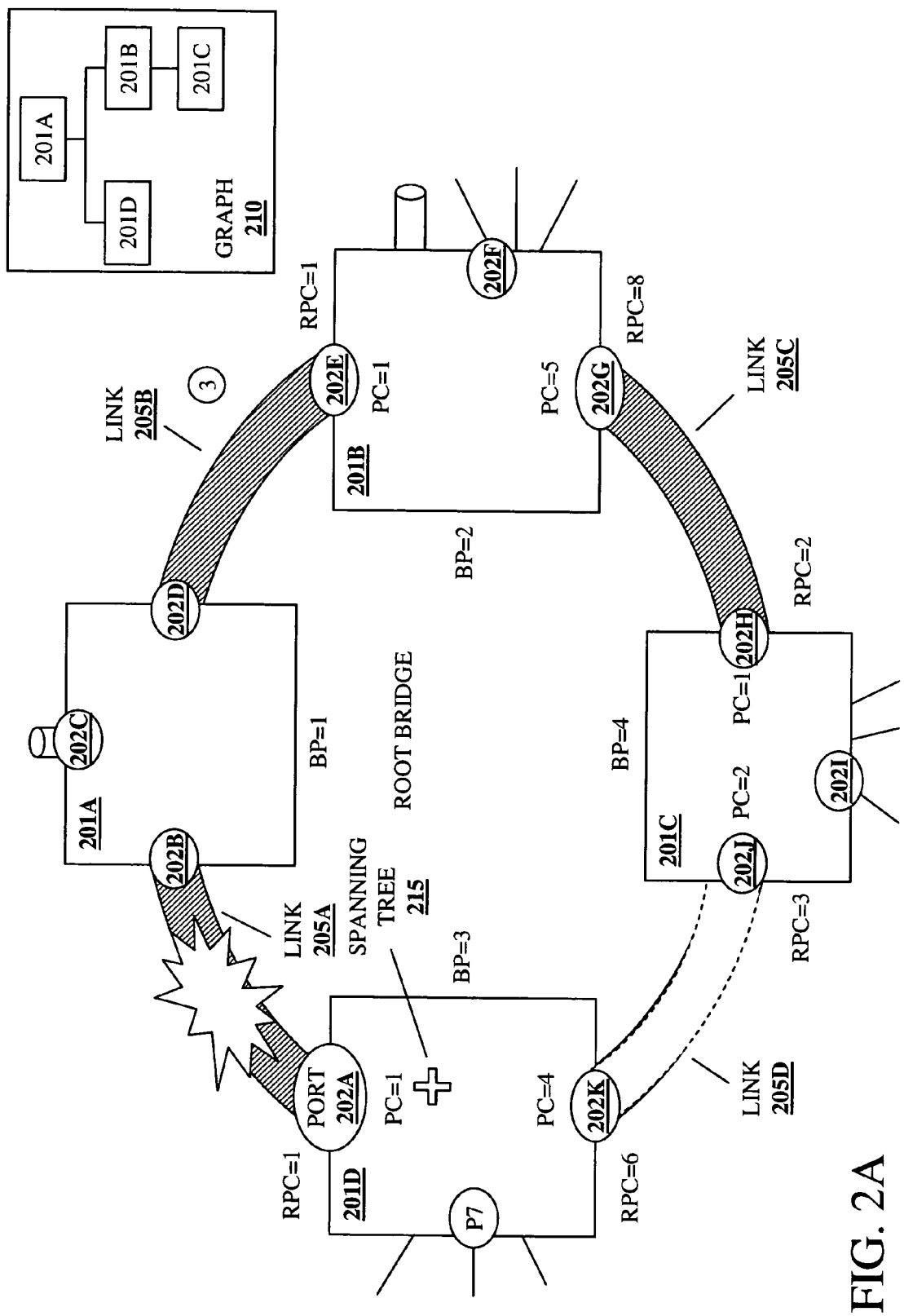
FIG. 2A is an exemplary diagram illustrating failure in an optical ring with spanning trees according to one embodiment of the invention.
Figure 2B:
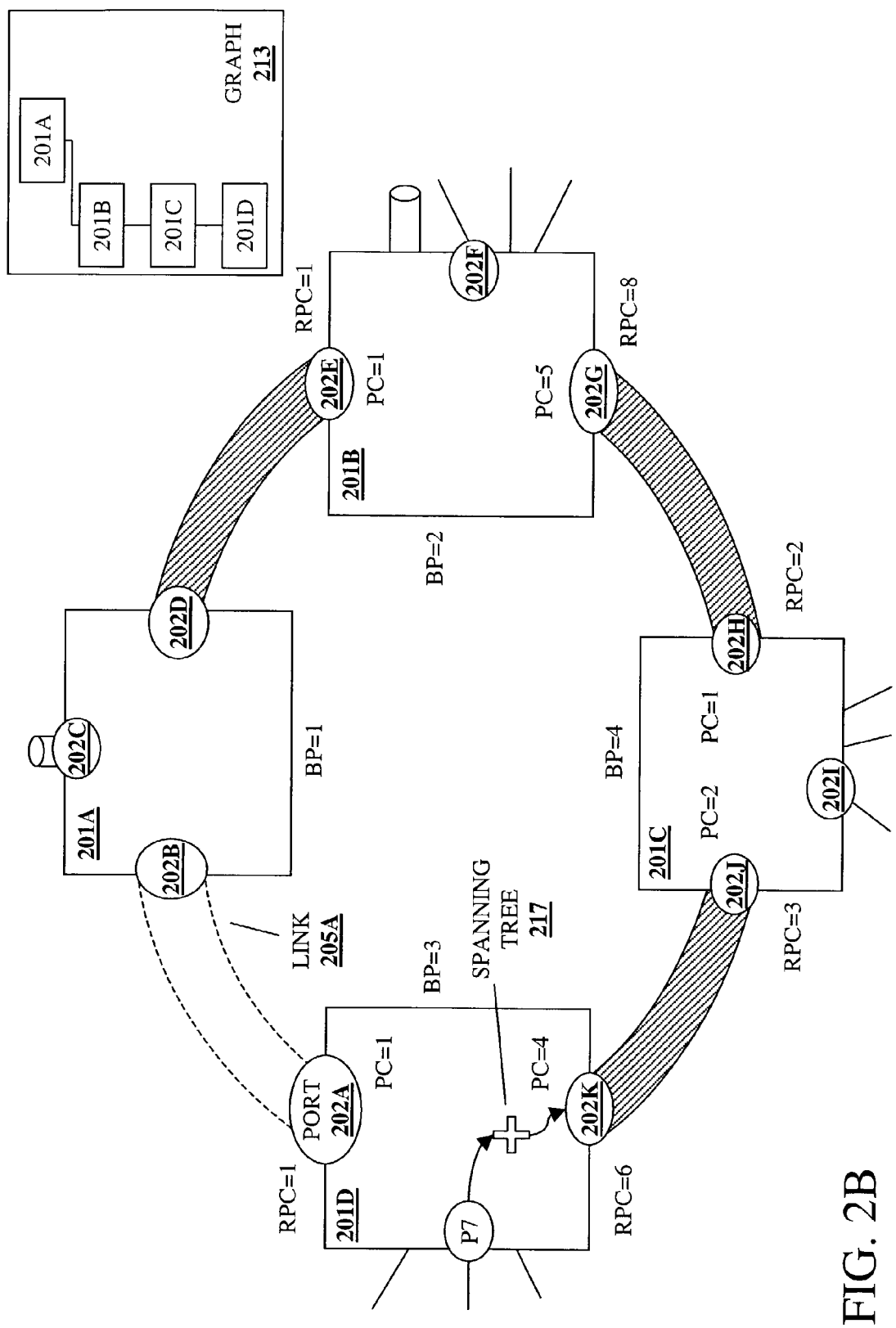
FIG. 2B is an exemplary diagram illustrating active links of a newly created spanning tree in an optical ring according to one embodiment of the invention.

FIGS. 2A-2B are exemplary diagrams illustrating protection of data traffic with spanning trees in an optical ring according to one embodiment of the invention. FIG. 2A is an exemplary diagram illustrating failure in an optical ring with spanning trees according to one embodiment of the invention. In FIG. 2A, network elements 201A-201D comprise an optical ring. The optical ring is connected in the following manner: the link 205A connects to a network element 201D and 201A, the link 205B connects the network elements 201A and 201B, the link 205C connects the network elements 201B and 201C and link 205D connects network elements 201C and 201D.

In FIG. 2A, the network element 201A has been designated as the root bridge. A spanning tree 215 in the network element 201D forwards traffic to the port 202A along the link 205A to the root bridge network element 201A. A graph 210 illustrates the spanning tree 215. The root bridge network element 201A forwards the traffic to a port 202C where the traffic exits the ring. The root path costs throughout the ring are shown in Table 3 below. When the link 205A fails, root path costs are recalculated and a new spanning tree is created at each network element throughout the ring.

| LINK | PORT | ROOT PATH COSTS |
| --- | --- | --- |
| 1D → 1A | 202A | 1 |
| 1D → 1A | 202K | 6 |
| 1C → 1A | 202J | 3 |
| 1C → 1A | 202H | 2 |
| 1B → 1A | 202E | 1 |
| 1B → 1A | 202G | 8 |

Table 3

Root Path Costs

FIG. 2B is an exemplary diagram illustrating active links of a newly created spanning tree in an optical ring according to one embodiment of the invention. In FIG. 2B, the link 205A has been discarded due to a failure. Now traffic is forwarded from the network element 201D in accordance with a spanning tree 217 through the previously blocked port 202K and along the previously discarded link 205D. The root path costs used for new spanning trees at each network element are shown in Table 4 below. Based on Table 4, the network element 201D is the only network element that creates a new spanning tree. The graph 213 illustrates the new spanning tree 217.

TABLE 4

Root Path Costs

| LINK | PORT | ROOT PATH COSTS |
|---|---|---|
| 205D → 205A | 202A | 200 (default for failed link) |
| 205D → 205A | 202B | 6 |
| 205C → 205A | 202I | 202 |
| 205C → 205A | 202G | 2 |
| 205B → 205A | 202D | 1 |
| 205B → 205A | 202F | 207 |

Figure 3:
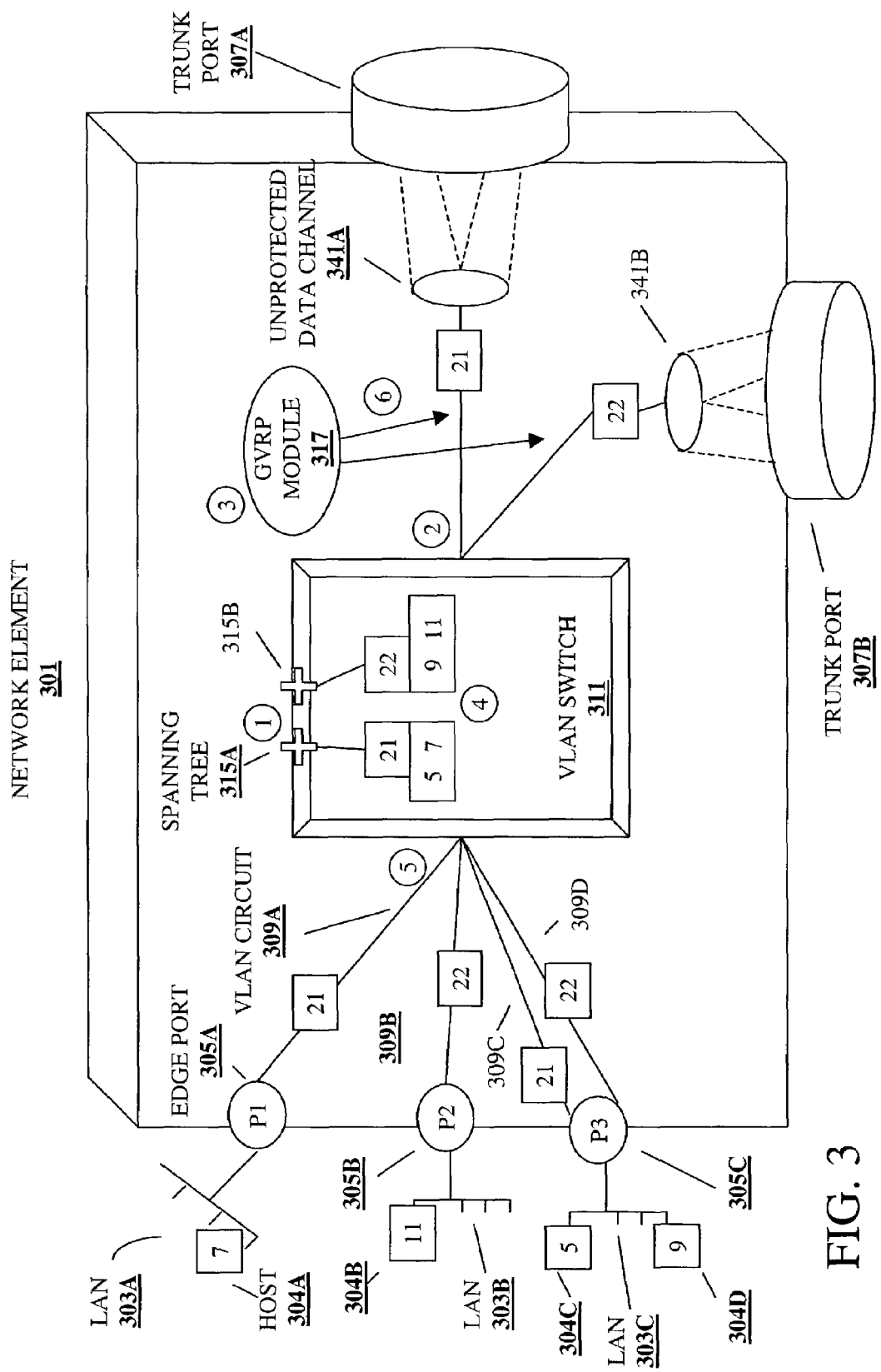
FIG. 3 is an exemplary diagram illustrating binding a spanning tree to VLANs according to one embodiment of the invention.

FIG. 3 is an exemplary diagram illustrating binding a spanning tree to VLANs according to one embodiment of the invention. In FIG. 3, a network element 301 includes a VLAN switch 311, edge ports 305A-305C, and trunk ports 307A-307B.

The edge ports 305A-305C respectively connect the network element to local area networks (LANs) 303A-303C. The LAN 303A includes a host 304A with a MAC address 7. The LAN 303B includes a host 304B with a MAC address 11. The LAN 303C includes a host 304C with a MAC address 5 and a host 304D with a MAC address 9.

At a time 1, spanning trees 315A-315B are created. At a time 2, the spanning tree 315A is coupled to the VLAN switch 311 and bound to the trunk port 307A. The spanning tree 315B is coupled to the VLAN switch 311 and bound to the trunk port 307B. At a time 3, a generic attribute registration protocol (GARP) virtual local area network (VLAN) registration protocol (GVRP) module 317 is enabled on the trunk port 307A-307B. At a time 4, VLANs are defined in the VLAN switch 311. A VLAN 21 is defined as including MAC addresses 5 and 7. A VLAN 22 is defined as including MAC addresses 9 and 11. At a time 5, VLAN circuits are created between the edge ports 305A-305C and the VLAN switch 311. A VLAN circuit 309A is created from the VLAN switch 311 to the edge port 305A for the VLAN 21. A VLAN circuit 309B is created from the VLAN switch 311 to the edge port 305B for the VLAN 22. A VLAN circuit 309C is created for each of the VLANs 21 and 22 between the port 305C and the VLAN switch 311. At a time 6, the GVRP module 317 creates a VLAN circuit between the spanning tree 315A and an unprotected data channel 341A on the trunk port 307A for the VLAN 21. The GVRP module 317 also creates a VLAN circuit between the spanning tree 315B and an unprotected data channel 341B on the trunk port 307B.

Figure 4:
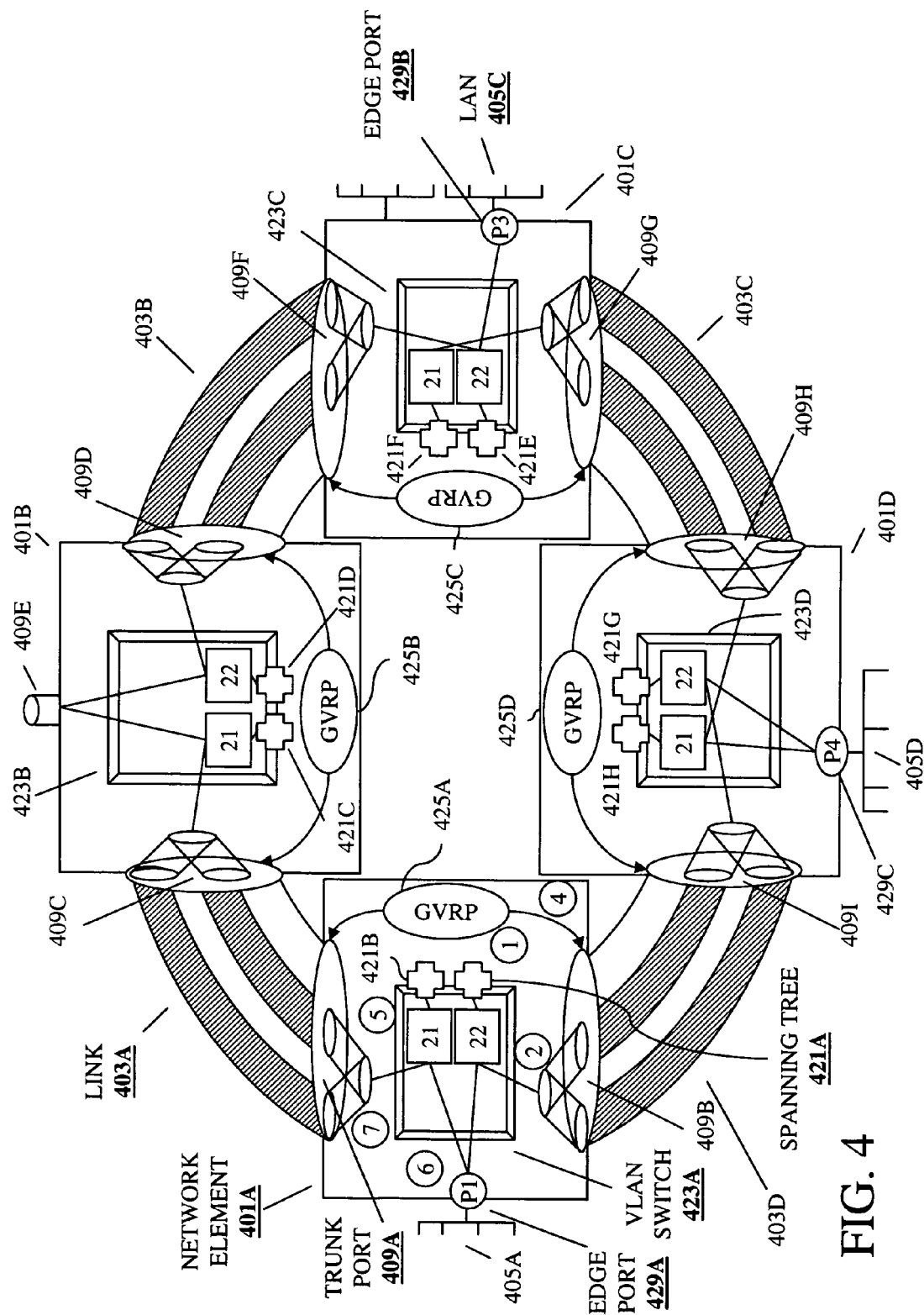
FIG. 4 is an exemplary diagram illustrating VLAN circuits and spanning trees in a optical ring according to one embodiment of the invention.

FIG. 4 is an exemplary diagram illustrating VLAN circuits and spanning trees in a optical ring according to one embodiment of the invention. In FIG. 4, an optical ring includes network elements 401A-401D. The network elements 401A-401D are connected with links having an unprotected data channel in the following manner: a link 403A connects the network elements 401A and 401B, a link 403B connects the network elements 401B and 401C, a link 403C connects the network elements 401A and 401D, and a link 403B connects the network elements 401D and 401A.

The network element 401A includes a GVRP module 425A, spanning trees 421A-421B, a VLAN switch 423A, trunk ports 409A-409B, and an edge port 429A. The trunk port 409A connects to the link 403A. The trunk port 409B connects to the link 403D. The edge port 429A connects to a LAN 405A.

The network element 401B includes a GVRP module 425B, spanning trees 421C-421D, a VLAN switch 423B, and trunk ports 409C-409E. The trunk port 409C connects the network element 401D to the link 403A. The trunk port 409D connects the network element 401C to the link 403B. The trunk port 409E connects the network element 401B to another core network element in a different ring.

The network element 401C includes a GVRP module 425C, spanning trees 421E-421F, a VLAN switch 423C, trunk ports 409F-409G, and an edge port 429B. The edge port 429B connects the network element 401C to a local area network 405C. The trunk ports 409F connects the network element 401C to the link 403B. The trunk port 409G connects the network element 401C to the link 403C.

The network element 401D includes a GVRP module 425D, spanning trees 421G-421H, a VLAN switch 423D, trunk ports 409H-409I, and an edge port 429C. The edge port 429C connects the network element 401D to a LAN 405D. The trunk port 409H connects the network element 401D to the link 403C. The trunk port 409I connects the network element 401D to the link 403D.

In the network element 401A, the spanning tree 421A is bound to the trunk port 409B and the spanning tree 421B is bound to the trunk port 409A. As described in FIG. 3, the spanning tree 421B is associated with a VLAN 21 and the spanning tree 421A is associated with a VLAN 22. The VLAN switch 423A creates VLAN circuits for the VLAN 21 and 22 to the edge port 429A. The GVRP module 425A creates VLAN circuits on the trunk ports 409A and 409B for the VLANs 21 and 22. In the network elements 401B-401D, the VLANs are learned from the network element 401A. After learning the VLANs from the network element 401A, the network elements 401B-401D will create circuits in the same fashion that the network element 401A created VLAN circuits. Alternatively, each of the VLANs are defined in the VLAN switches 423B-423D respectively on the network elements 401B-401D. After defining the VLANs within the network elements 401B-401D, the VLAN circuits are created as described with respect to the network element 401A.

Figure 5A:
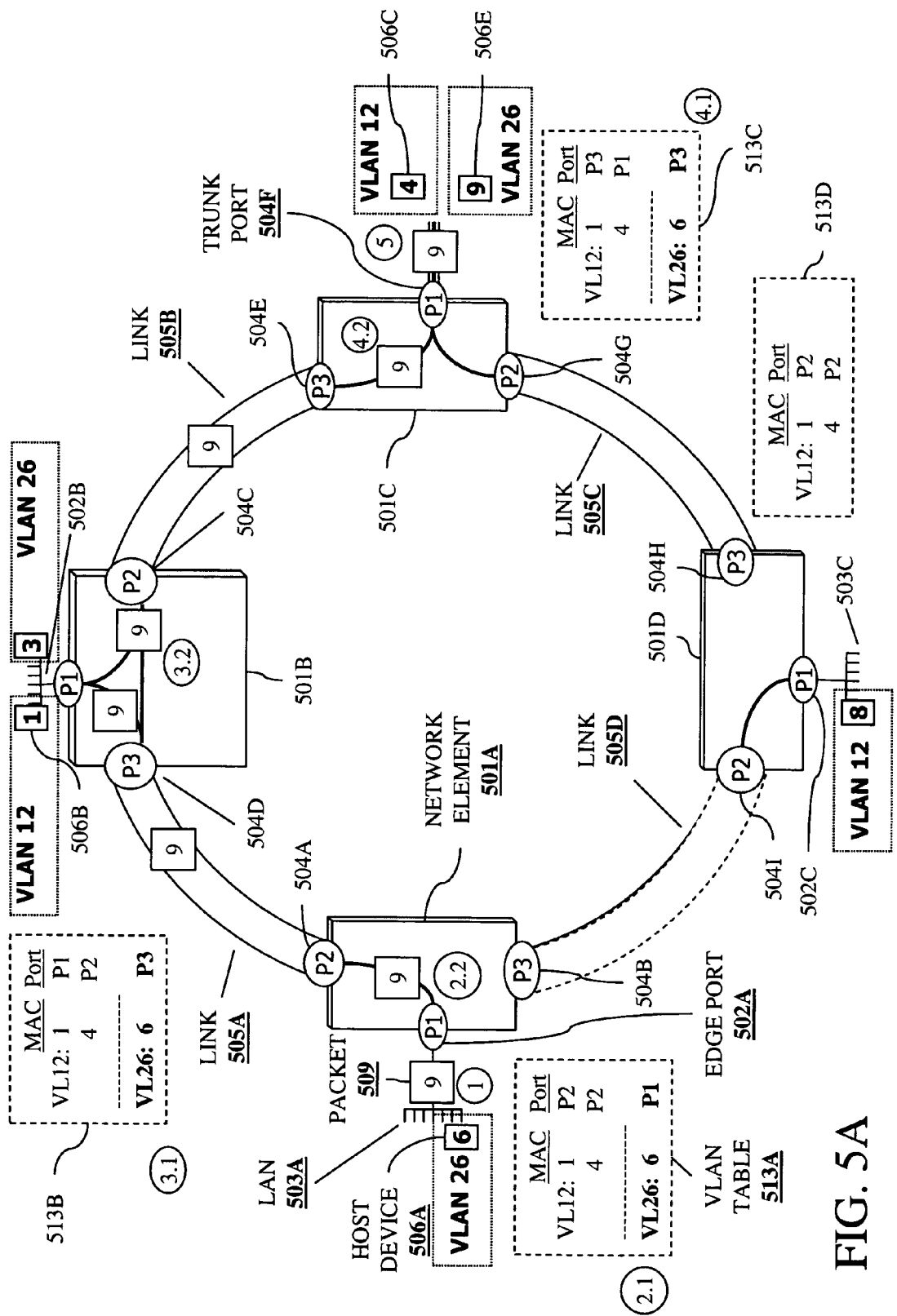
FIG. 5A is an exemplary diagram illustrating MAC address learning in an optical ring according to one embodiment of the invention.
Figure 5B:
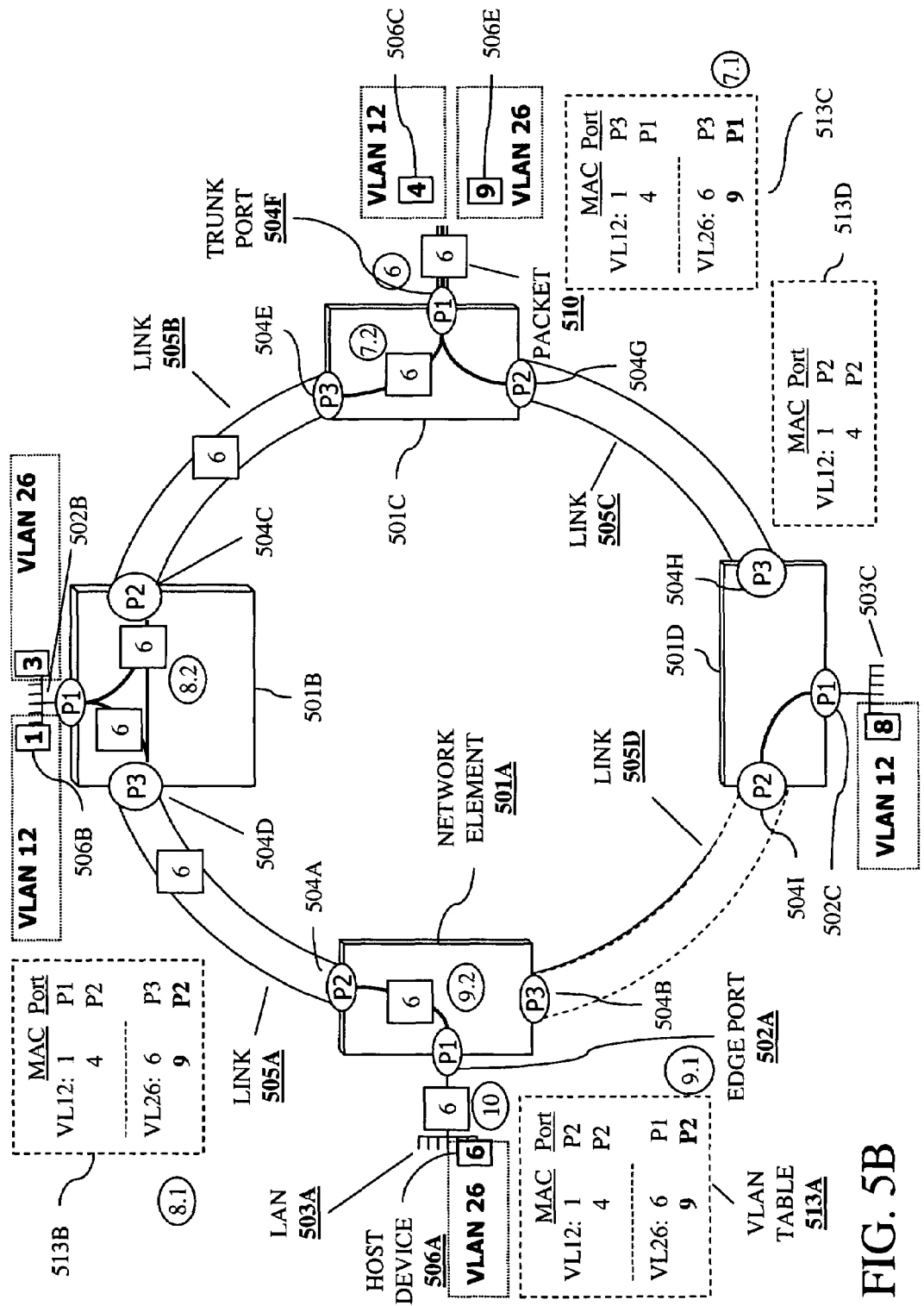
FIG. 5B is an exemplary diagram illustrating MAC address learning in an optical ring continuing from FIG. 5A according to one embodiment of the invention.

FIGS. 5A-5B are exemplary diagrams illustrating network elements in an optical ring learning MAC addresses for VLANs associated with different spanning trees according to one embodiment of the invention. FIG. 5A is an exemplary diagram illustrating MAC address learning in an optical ring according to one embodiment of the invention. In FIG. 5A, an optical ring is comprised of network elements 501A-501D. The network elements 501A and 501B are connected with a link 505A. The network elements 501B and 501C are connected with a link 505B. The network elements 501C and 501D are connected with a link 505C. The network elements 501D and 501A are connected with a link 505D. The network element 501A is connected with a LAN 503A via an edge port 502A. The LAN 503A includes a host 506A of a VLAN 26 with a MAC address 6. The network element 501A utilizes a VLAN table 513A. At a time 1, the host 506A sends a packet 509 addressed to a host with a MAC address of 9. The packet 509 is received by the edge port 502A at the network element 501A. At a time 2, the spanning tree associated with the VLAN 26 forwards the packet 509 to the trunk port 504A, since the trunk port 504B is blocked by the spanning tree. At a time 3, the packet 509 is received at the network element 501B via a trunk port 504D and forwarded out the edge port 502B and the trunk port 504C. At this time, the network element 501B modifies a VLAN table 513B to indicate the MAC address 6 and trunk port 504D for the VLAN 26. At a time 4, the packet 509 is received by the network element 501C at a trunk port 504E. The packet 509 is forwarded out the trunk port 504F to eventually be received by a host 506E with a MAC address 9. The network element 501C modifies a VLAN table 513C to indicate MAC address 6 and the trunk port 504E.

FIG. 5B is an exemplary diagram illustrating MAC address learning in an optical ring continuing from FIG. 5A according to one embodiment of the invention. In FIG. 5B, the machine 506E responds to the machine 506A with a packet 510. At a time 1, the network element 501C receives the packet 510 and modifies the VLAN table 513C. The network element 501C modifies the VLAN table 513C to include an entry for VLAN 26 indicating a MAC address of 9 and the trunk port 504F. At a time 2, the network element 501B receives the packet 510 on the trunk port 504C and forwards the packet to the trunk port 504C and the edge port 502B. The network element 501B modifies the VLAN table 513B to include an entry for the VLAN 26 that indicates MAC address 9 and trunk port 504C. At a time 3, the network element 501A receives the packet 510 via the trunk port 504A and forwards it to the edge port 502A. The network element 501A modifies the VLAN table 513A to include an entry for the VLAN 26 that indicates MAC address 9 and the trunk port 504A.

The network elements described in the Figures include memories, processors, and/or ASICs. Such memories include a machine-readable medium on which is stored a set of instructions (i.e., software) embodying any one, or all, of the methodologies described herein. Software can reside, completely or at least partially, within this memory and/or within the processor and/or ASICs. For the purpose of this specification, the term "machine-readable medium" shall be taken to include any mechanism that provides (i.e., stores and/or transmits) information in a form readable by a machine (e.g., a computer). For example, a machine-readable medium includes read only memory ("ROM"), random access memory ("RAM"), magnetic disk storage media, optical storage media, flash memory devices, electrical, optical, acoustical, or other forms of propagated signals (e.g., carrier waves, infrared signals, digital signals, etc.), etc.

While the invention has been described in terms of several embodiments, those skilled in the art will recognize that the invention is not limited to the embodiments described. For example, unprotected channels are described within the context of a single optical ring, but an unprotected channel may traverse multiple optical rings within an optical network. The method and apparatus of the invention can be practiced with modification and alteration within the spirit and scope of the appended claims. The description is thus to be regarded as illustrative instead of limiting on the invention.

We claim:

1. A computer implemented method comprising:
provisioning a first and second unprotected data channel in an optical ring network;
configuring a first of a plurality of spanning trees to discard a first link in said optical ring network;
associating the first spanning tree with the first unprotected data channel;
configuring a second of the plurality of spanning trees to discard a second link of said optical ring network;
associating the second spanning tree with the second unprotected data channel;
forwarding data traffic over the first unprotected data channel on the second link in accordance with the first spanning tree; and
while there is a failure in the optical ring network that affects the first unprotected data channel, forwarding data traffic over the second unprotected data channel on the first link in accordance with the second spanning tree.

2. The method of claim 1 wherein the plurality of spanning trees are rapid spanning trees.

3. The method of claim 1 wherein a third of the plurality of spanning trees is associated with a virtual local area network.

4. A computer implemented method comprising:
associating a first virtual local area network (VLAN) with a first spanning tree, the first spanning tree blocking a first trunk port of a network element;
forwarding the first VLAN's traffic out a second trunk port of the network element over a first set of subchannels to another network element in accordance with the first spanning tree;
modifying a VLAN table to indicate a source address of a first packet and a source address of a second packet are associated with the first VLAN and a port of the network element, the first packet and the second packet received by the network element, the second packet sent in response to the first packet, the source addresses of the first packet and the second packet corresponding to host devices that are not connected to the network element by a local area network (LAN) or direct connection;
associating a second VLAN with a second spanning tree, the second spanning tree blocking the second trunk port of the network element; and
forwarding the second VLAN's traffic through the first trunk port over a second set of subchannels to another network element in accordance with the second spanning tree, wherein forwarding the first and second VLAN's traffic is done concurrently.

5. The method of claim 4 wherein the first spanning tree is a rapid spanning tree.

6. The method of claim 4 further comprising a third spanning tree that is associated with an unprotected data channel, the third spanning tree used to protect the unprotected data channel.

7. A method in a network element comprising:
configuring multiple spanning trees in a set of one or more network elements of an optical ring network;
load balancing data traffic transmitted in unprotected data channels provisioned through the optical ring network with the multiple spanning trees, each unprotected data channel including a set of subchannels for transmitting data traffic between network elements;
protecting the unprotected data channels with the multiple spanning trees by creating a new spanning tree at each network element in response to an updated root path cost; and
modifying a VLAN table to indicate source addresses of a first packet and a second packet are associated with a VLAN and a port of the network element, the first packet and the second packet received by a network element of the set of one or more network elements, the second packet sent in response to the first packet, the source addresses of the first packet and the second packet corresponding to host devices that are not connected to the network element by a local area network (LAN) or direct connection.

8. The method of claim 7 wherein at least one of the multiple spanning trees is a rapid spanning tree.

9. An apparatus in an optical ring network comprising:
a set of one or more lines to carry traffic;
a set of one or more ports coupled with the set of lines, each of the set of ports to receive the traffic carried by the set of lines; and
a machine readable medium coupled with the set of ports, the machine-readable medium to cause the apparatus to configure multiple spanning trees in a set of one or more network elements of the optical ring network, to load balance data traffic with the multiple spanning trees, the data traffic to be transmitted in unprotected data channels provisioned through the optical ring network, each unprotected data channel to include a set of subchannels for transmitting data traffic between network elements, to protect the unprotected data channels with the multiple spanning trees by creating a new spanning tree at each network element in response to an updated root path cost, and to modify a VLAN table to indicate source addresses of a first packet and a second packet are associated with a VLAN and a port of a network element, the first packet and the second packet received by the network element of the set of one or more network elements, the second packet sent in response to the first packet, the source addresses of the first packet and the second packet corresponding to host devices that are not connected to the network element by a local area network (LAN) or direct connection.

10. An optical ring network comprising:

a first network element of the optical ring network having a first set of instructions to cause the first network element to associate a first of a plurality of spanning trees with a first unprotected data channel provisioned within the optical ring network, the first unprotected data channel including a first set of subchannels, the first spanning tree to forward traffic along the first set of subchannels in the first unprotected data channel through a first port of the first network element and to block a second port of the first network element, wherein blocking the second port is based on a root path cost of the second port, the first network element to include a VLAN table to indicate a source address of a first packet and a source address of a second packet are associated with a VLAN and a port of the first network element, the first packet and the second packet received by the first network element, the second packet sent in response to the first packet, the source addresses of the first packet and the second packet corresponding to host devices that are not connected to the first network element by a local area network or direct connection; and a second network element of the optical ring network coupled with the first network element, the second network element having a second set of instructions to cause the second network element to load balance data traffic with the plurality of spanning trees.

* * * * *

UNITED STATES PATENT AND TRADEMARK OFFICE
CERTIFICATE OF CORRECTION

PATENT NO. : 7,680,031 B1
APPLICATION NO. : 10/159625
DATED : March 16, 2010
INVENTOR(S) : Luft et al.

It is certified that error appears in the above-identified patent and that said Letters Patent is hereby corrected as shown below:

In Column 4, Lines 41-49, delete "

| LINK |
|---|
| 1D → 1A |
| 1D → 1A |
| 1C → 1A |
| 1C → 1A |
| 1B → 1A |
| 1B → 1A |

" and insert --

| LINK |
|---|
| 201 D → 201 A |
| 201 D → 201 A |
| 201 C → 201 A |
| 201 C → 201 A |
| 201 B → 201 A |
| 201 B → 201 A |

--, therefor.

Signed and Sealed this

Twenty-second Day of June, 2010

David J. Kappos
*Director of the United States Patent and Trademark Office*